United States Patent [19]

Tanaka

[11] Patent Number: 4,789,114
[45] Date of Patent: Dec. 6, 1988

[54] COMPOSITE TAPE GUIDE OF CASSETTE TAPE FOR VTR

[75] Inventor: Masamitsu Tanaka, Tokyo, Japan

[73] Assignee: Sanwa Needle Bearing Co., Ltd., Tokyo, Japan

[21] Appl. No.: 85,206

[22] Filed: Aug. 14, 1987

[30] Foreign Application Priority Data

Dec. 15, 1986 [JP] Japan .................. 61-298367
Dec. 15, 1986 [JP] Japan .................. 61-192545
Dec. 15, 1986 [JP] Japan .................. 61-192546

[51] Int. Cl.$^4$ ............................................. G11B 23/08
[52] U.S. Cl. ............................ 242/199; 242/76
[58] Field of Search ............ 242/76, 157 R, 197–200; 226/196–199; 360/132

[56] References Cited

U.S. PATENT DOCUMENTS

| 3,889,900 | 6/1975 | Nelson ................... | 242/199 |
| 4,365,769 | 12/1982 | Shoji ..................... | 242/199 |
| 4,427,166 | 1/1984 | Oishi et al. ............. | 242/199 |
| 4,429,823 | 2/1984 | Umehara ................. | 242/199 X |
| 4,466,582 | 8/1984 | Shiba ..................... | 242/199 X |
| 4,545,500 | 10/1985 | Yamaguchi et al. ...... | 242/199 X |

FOREIGN PATENT DOCUMENTS 2808998 9/1979 Fed. Rep. of Germany .
53-160925 12/1978 Japan .
57-127951 8/1982 Japan .

Primary Examiner—David Werner
Attorney, Agent, or Firm—Sandler & Greenblum

[57] ABSTRACT

A composite tape guide for a cassette tape for a video tape recorder includes a cylindrical tape guide body formed of inexpensive material such as plastic. More than half of the circumferential surface of the tape guide body which contacts a video tape is covered with a sheet member of nonmagnetic material. This material has improved wear resistance and anti-corrosive properties, and exhibits less frictional resistance against the tape than the remainder of the guide body surface. Thus, the guide exterior surface forms a composite of layer of two different materials.

6 Claims, 5 Drawing Sheets

COMPOSITE TAPE GUIDE OF CASSETTE TAPE FOR VTR

FIELD OF THE INVENTION

This invention relates to a composite tape guide for a cassette tape for VTR which is essentially used by mounting in a cassette tape for VTR and which has a body formed of inexpensive and conveniently workable materials wherein a range larger than the surface of the tape guide contacting a tape is covered with a sheet member of nonmagnetic material of improved wear-resistant and anticorrosive properties, but which exhibits less frictional resistance against the tape, such as stainless steel, to ensure the same high precision and anticorrosive and wear-resistant properties as conventional tape guides, but with less frictional resistance against the tape and with productivity at a lower cost.

BACKGROUND OF THE INVENTION

Hitherto, there has generally been utilizes a tape guide 81 of a type as shown in FIG. 1 (A) which is formed of stainless steel tube cut in accordance with a predetermined size and has inner and outer diameters determined so as to be releasably mounted to a cassette case C as illustrated in FIG. 2 or a tape guide 82 of a type as shown in FIG. 1 (B) which is formed of a cylindrically rolled stainless steel plate with steeply bevelled four corners so that its bevelled portions may form locating recesses 83 for preventing rotation when mounted in a cassette case C.

Recently, the reduction of cost over every VTR product has been required, as well as for the tape guide of a cassette tape for VTR.

The reduction of cost may be attained by decreasing the production costs and suppressing the material costs.

In case of tape guides 81 and 82 of the types as hereinbefore described, production costs may be reduced only by two solutions, by improvement of manufacture into the form of a readily mouldable process, or an automatic operation to reduce the labor cost. Processing of tape guides 81 and 82 of those types, however, have already been almost automated, for which reason an improvement in processing yet could not achieve a sharp reduction in cost. In present manufacture, production on such a large scale as hundreds of thousands or millions have been carried out, so that the production cost per piece unit is insignificant.

Consequently, there is no alternative but reduce the material cost or the proportion thereof. Tape guides 81 and 82, of the types as hereinbefore described, are wholly formed of high quality stainless steel, even at high cost, encountering difficulty in reduction of the cost and proportions of the material.

It has therefore been attempted to reduce material costs by thinning the whole plate thickness, notwithstanding that the inner and outer diameters of the tape guides 81 and 82 have been standardized on account of the formation of the cassette case C, for which reason it was difficult to moderate the plate thickness.

In order to be victorious in international competition, price-cutting is inevitably required, and every manufacturer has had a fierce competition, notwithstanding that no significant reduction in cost has yet been achieved.

In consideration of the foregoing various problems, an object of the invention is to provide at a considerably reduced price, a tape guide which is used by mounting in a cassette tape for VTR and which preserves the same high precision and anticorrosive and wear-resistant properties as conventional tape guides, but which exhibits less frictional resistance against the tape.

SUMMARY OF THE INVENTION

According to the invention, there is provided a composite tape guide of a cassette tape for VTR in which a cylindrical tape guide body is formed of such inexpensive materials as plastic, and in which a circumferential surface of said tape guide body, at least in a range larger than the surface contacting a tape for VTR, is covered with a sheet member of nonmagnetic materials of improved wear-resistant and anticorrosive properties, but with less frictional resistance against the tape to form a composite layer of two different materials.

A tape guide of a cassette tape for VTR, when used, is in frictional contact with a tape without any rotation. Only the portion in frictional contact with the tape may, therefore, be formed as a nonmagnetic surface of improved wear-resistant and anticorrosive properties but less frictional resistance against the tape.

In the composite tape guide of a cassette tape for VTR according to the invention, the greater part of the cylindrical tape guide may be formed of inexpensive materials such as plastics.

The circumferential surface of the tape guide body, at least in a range larger than the surface contacting with the tape for VTR, is covered with a sheet member of non-magnetic materials of improved wear-resistant and anticorrosive properties, such as stainless steel to form a composite layer of two different materials, thereby to ensure the same high precision as conventional tape guides.

For better understanding, the invention will now be described hereinafter with reference to the accompanying drawings.

PREFERRED EMBODIMENTS OF THE INVENTION

Figure 3:
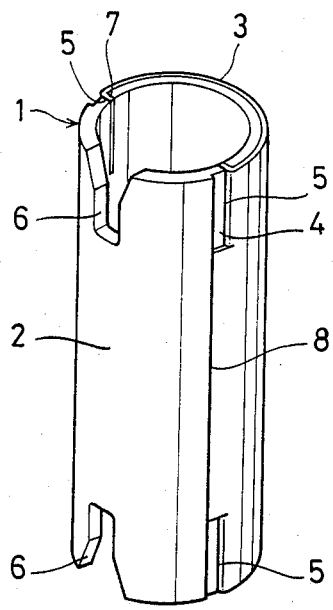
FIG. 3 is a perspective view of a first embodiment of a tape guide according to the invention.
Figure 4:
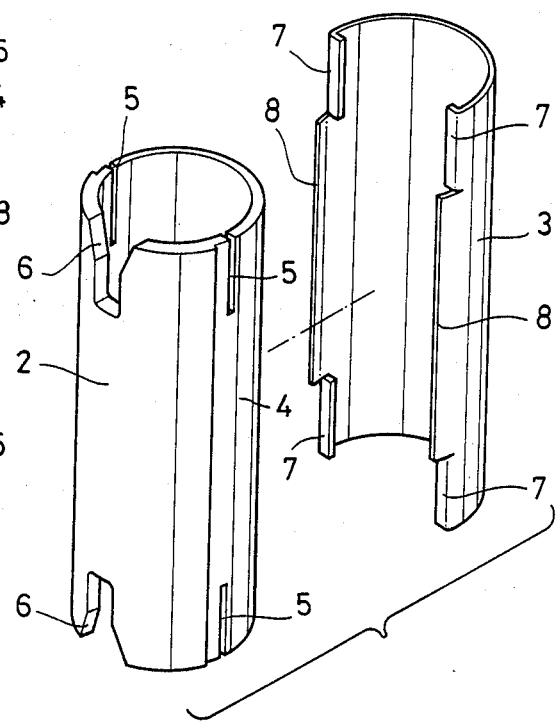
FIG. 4 is a disassembled perspective view of the tape guide of FIG. 3.
Figure 5:
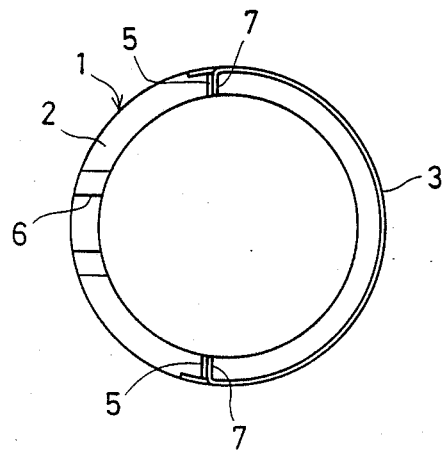
FIG. 5 is a plan view of the tape guide of FIG. 3.

In drawings, the numerical reference 1 represents a composite tape guide and in the first embodiment according to the invention as shown in FIGS. 3 to 5 it comprises a cylindrical tape guide body 2 and a sheet tape contact member 3 adapted to cover the range larger than the surface contacting with the tape for VTR on the circumferential surface thereof.

The tape guide body 2 of inexpensive and conveniently processable plastics is formed into a cylinder of predetermined inner and outer diameters which is provided with a covering portion 4 stepped for receiving a thickness of a tape contact member 3 only at the surface contacting with a tape contact member 3 along an outer circumference thereof. In the vicinity of the boundary of the stepped portion of the covering portion 4, the tape guide body 2 at its opposite ends is provided with four engaging slits 5 of a predetermined length, while a part other than the covering portion 4 in the tape guide body 2 is provided at its opposite ends with V-shaped locating recesses 6 respectively, for preventing the composite tape guide 1 from rotating when mounted in a cassette case C.

The tape contact member 3, on the other hand, comprises a sheet member made of nonmagnetic materials of improved wear-resistance and anticorrosive properties, such as stainless steel which is formed into a circular arc of a curvature somewhat larger than a semicircular arc or portion, for example, covering around 200 degrees, in the circumferential direction of the tape guide body 2 and the curvature thereof is somewhat smaller than that of the covering portion 4 of the tape guide body 2 so that no clearance is formed between the covering portion 4 and the tape contact member 3. Furthermore, the tape contact member 3 is bent inwardly at the edges of the opposite side ends 8, 8 in order to form engaging rims 7.

Covering the tape guide body 2 with the tape contact member 3 thus constructed is carried out by slightly expanding the tape contact member 3 against the elasticity thereof for mounting on the covering portion 4 of the tape guide body 2 via engagement of the engaging rims 7 with the engaging slits 5. An actual size of the composite tape guide 1 is determined such that the tape guide body 2 has the 4.8 mm inner diameter and 6.0 mm outer diameter, the covering portion 4 having a 0.15 mm less thickness radius, and the tape contact member 3 is 0.15 mm being thickness. Thus, the tape contact member 3 may conveniently be expanded and restored to its original size on account of its thickness of 0.15 mm.

The tape guide body 2 occupying a predominant part of the composite tape guide 1 is formed of inexpensive materials like plastics, and only an essential part contacting with the tape is covered by materials such as stainless steel so as to have nonmagnetic, wear-resistant and anticorrosive properties with less frictional resistance against the tape, so that it would never be inferior in function but would be sharply reduced in cost as compared with conventional tape guides 81 and 82.

Figure 6:
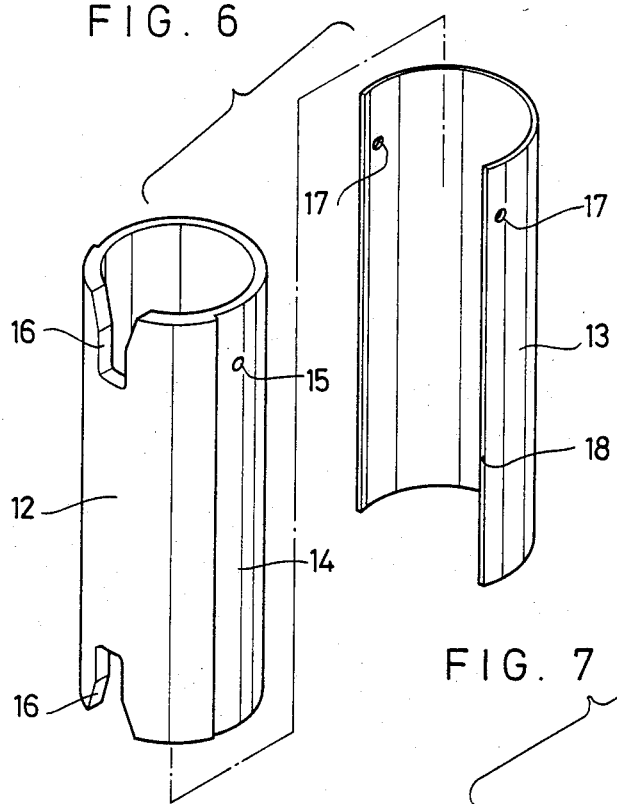
FIG. 6 is a disassembled perspective view of a second embodiment of the tape guide according to the invention.

The second embodiment as shown in FIG. 6 is similar in shape to the first embodiment but different in manner of engagement. Namely, in the first embodiment the engaging slits 5 are engaged with the engaging rims 7, while in the second embodiment the covering portion 14 of the tape guide body 12 is provided with engaging projections 15 each at a predetermined position in the vicinity of the stepped portions of the opposite sides and also with engaging slits 17 at the confronting positions of the contact member 13. The tape guide body 12 is mounted in the tape guide body 13 until the edge portions 18 are fitted to the stepped portions of the covering portion 14 for engaging the engaging projections 15 with the engaging slits 17 to be covered with the same effect as that of the first embodiment. In this case, the locating recesses 16 are provided respectively like the first embodiment.

Figure 7:
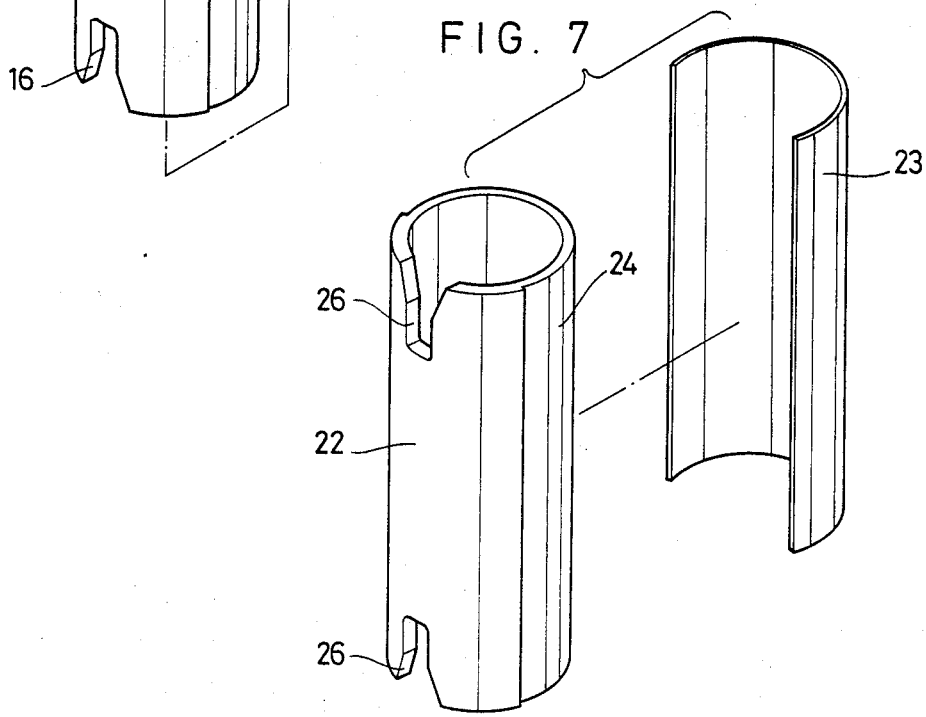
FIG. 7 is a disassembled perspective view of a third embodiment of the tape guide according to the invention.

In the third embodiment as shown in FIG. 7, there is no engaging projection 15 nor engaging slit 17 of the second embodiment but a tape contact member 23 is mounted into a covering portion 24 of a tape guide body 22. A possible slight divergence of the tape guide body 22 against the tape contact member 23 may be prevented by a curvature of the contact member 23 less than that of the covering portion 24 of the tape guide body 22 with an enhanced elasticity. When mounted in the cassette case, the contact member 23 at its opposite ends is fastened together with the tape guide body 22, without any slippage. Therefore, it should be appreciated that the third embodiment has the same effect as those of the first and second embodiments.

Figure 8:
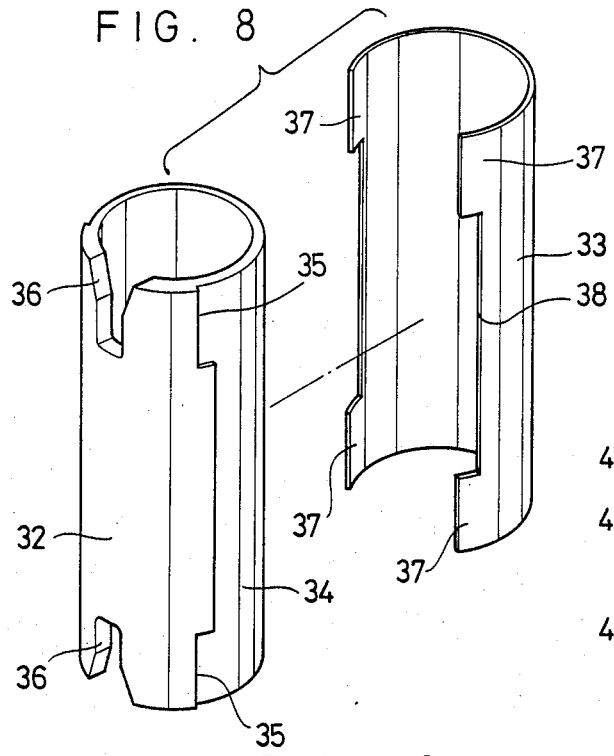
FIG. 8 is a disassembled perspective view of a fourth embodiment of the tape guide according to the invention.

The likelihood of a slight divergence of the tape contact member against the tape guide body 22, as hereinbefore described, may also be prevented by the structure of the fourth embodiment as shown in FIG. 8.

Like the third embodiment, a tape guide body 32 is provided with a covering portion 34 and locating recesses 36. The tape guide body 32, at opposite ends of the stepped portions of its covering portion 34, is further provided comments respectively, with engaging dents 35 which are formed by somewhat squarely expanding the covering portion 34 to the circumferential direction of the tape guide body 32. The tape contact member 33 is also formed like the tape contact member 23 of the third embodiment, and is provided at opposite ends of side edges 38 thereof with square-shaped engaging projections 37 for engaging the engaging dents 35. When the tape contact member 33 is fitted merely to the covering portion 34 of the tape guide body 32, an engagement of the engaging dents 35 with the engaging projections 37 prevents any divergence of the tape contact member 33 against the tape guide body 22 to complete covering.

Figure 9:
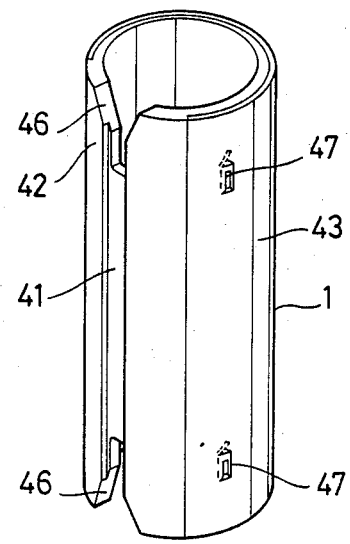
FIG. 9 is a perspective view of a fifth embodiment of the tape guide according to the invention.

In the fifth embodiment as shown in FIG. 9, a composite tape guide 1 of a structure almost identical to the first embodiment is covered with a tape contact member 43, simultaneously with the plastic moulding a tape guide body 42. Simultaneously with moulding the tape guide body 42, covering of the tape contact member 43 is carried out with a negligible operation, for which reason the fifth embodiment is somewhat superior to the first embodiment but brings the same effect as that of the first embodiment.

In this case, like the first embodiment, an engagement piece 47 of some shape may preferably be provided for stabilization. Locating recesses 46 are also required. The reference numeral 41 represents a guide groove which may be formed when desired on the plastic moulding in finishing the surface of the contact member 43.

Figure 10:
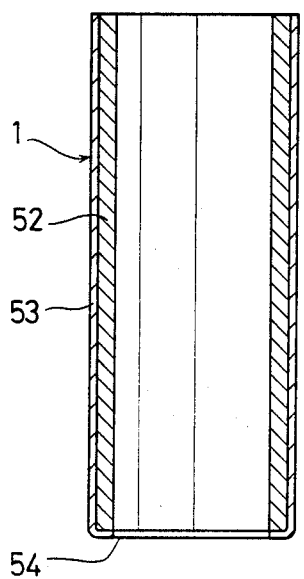
FIG. 10 is a front sectional view of a sixth embodiment of the tape guide according to the invention.
Figure 11:
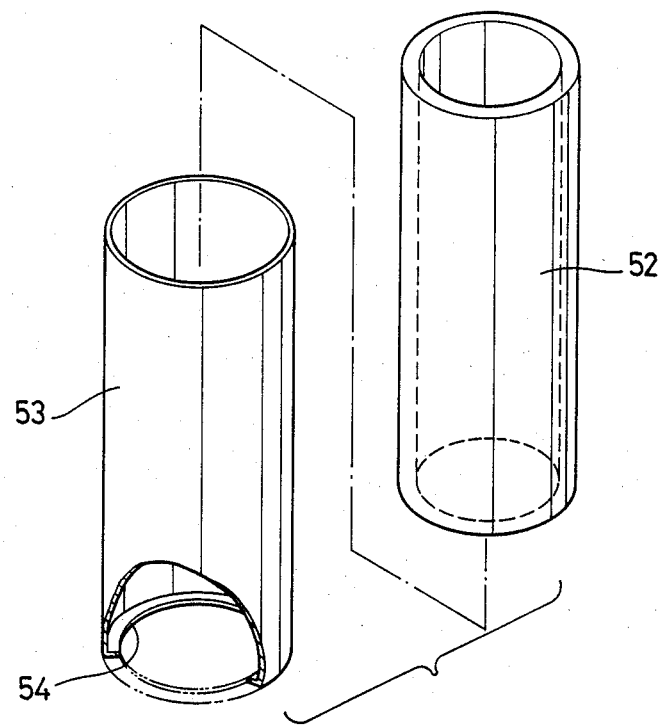
FIG. 11 is a disassembled perspective view of the tape guide of FIG. 10.

In the sixth embodiment as shown in FIGS. 10 and 11, a plastic cylindrical tape guide body 52 with a predetermined inside diameter is covered with a sheet tape contact cylinder 53, an outer diameter of which is determined like every embodiment as hereinbefore described. One end of the tape contact cylinder 53 is inwardly squeezed to form a flange for providing a journal recess 51 which prevents divergence when mounted in the tape guide body 52.

The composite tape guide 1, along its entire outer circumference, is covered with the tape contact cylinder 53, so that a V-shaped locating recess is not required as in each of the embodiments as hereinbefore described. The tape contact cylinder 53 is limited to 0.15 mm or so in thickness, as shown in the first embodiment, resulting in a negligible increase in material cost.

The whole covering of the tape contact cylinder 53 results in a considerably improved precision, together with the similar effects as those obtainable by the embodiments hereinbefore described.

Figure 12:
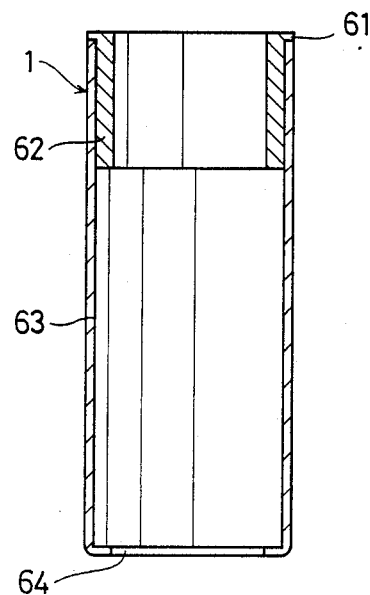
FIG. 12 is a front sectional view of a seventh embodiment of the tape guide according to the invention.

The seventh embodiment, as shown in FIG. 12, aims to further decrease the material cost as compared with those of the embodiments hereinbefore described, and provides a tape contact cylinder 63 having a journal recess 64 at its one end alike the tape contact cylinder 53 of the sixth embodiment. From an opposite end of the tape contact cylinder 63, is inserted under pressure a cylindrical tape guide body 62 of a length shorter than an internal length of the tape contact cylinder 63, and having flanges 61 at one end thereof to form a composite tape guide 1. The insertion of the tape guide body 62 is precluded by the flange 61 for staying only in a part of the tape contact cylinder 63.

In this case the material of the tape guide body 62 is possibly reduced for production at a lower cost than each embodiment hereinbefore described. The portion where the tape guide body 62 is inserted under pressured, and one end where the tape guide body 62 is forced inwardly into the tape contact cylinder 63, have substantial strength.

In place of the tape guide body 62 of the sixth embodiment, a stainless steel sheet may be forced into a shape similar to the tape guide body 62 to obtain a tape guide core cylinder for insertion into a tape contact cylinder. In this case, the tape guide core cylinder is also provided with a journal recess like that of the tape contact cylinder. The composite tape guide thus constructed may significantly reduce the material needed in order to reduce the material cost with another advantage obtainable by the sixth embodiment.

Figure 13:
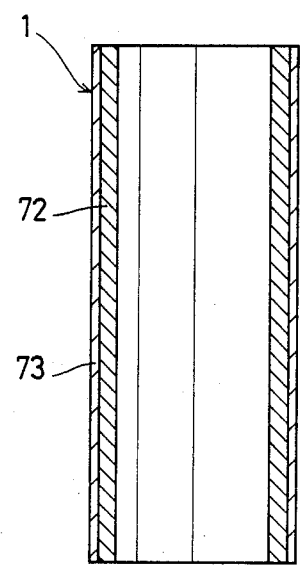
FIG. 13 is a front sectional view of an eighth embodiment of the tape guide according to the invention.

According to the seventh embodiment as shown in FIG. 13, a piping material is cut into an appropriate length to provide a thin tape contact cylinder 73 which is then mounted around a tape guide body 72 to obtain a composite tape guide 1. This embodiment may bring the same advantage as obtainable in each embodiment hereinbefore described.

The tape contact members 3, 13, 23, 33 and 43 or the tape contact cylinders 53, 63 and 73 of each embodiment as hereinbefore described may be made of manganese steel or ceramic materials to provide a composite tape guide 1 of more improved wear-resistant and anticorrosive properties that one made of stainless steel. Further, the surface formed of conveniently processable materials such as brass may preferably be plated with nonmagnetic materials of improved wear-resistant and anticorrosive properties but less frictional resistance against the tape, for example, hard metals such as chrome, to shorten an operation time and provide other advantages.

Figure 1A:
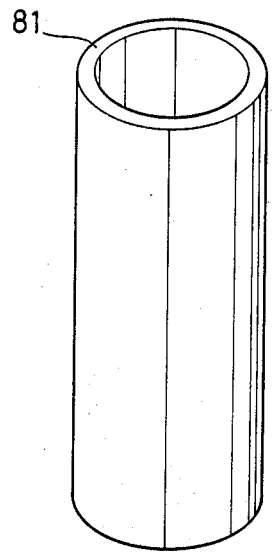
FIGS. 1A and 1B are perspective views of conventional tape guides.
Figure 1B:
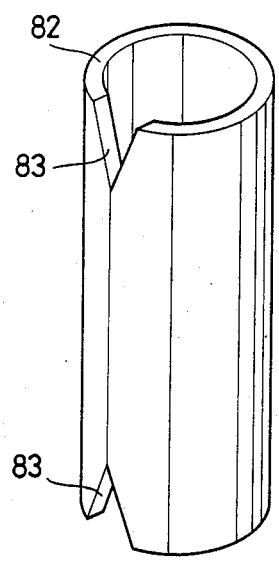
Figure 2:
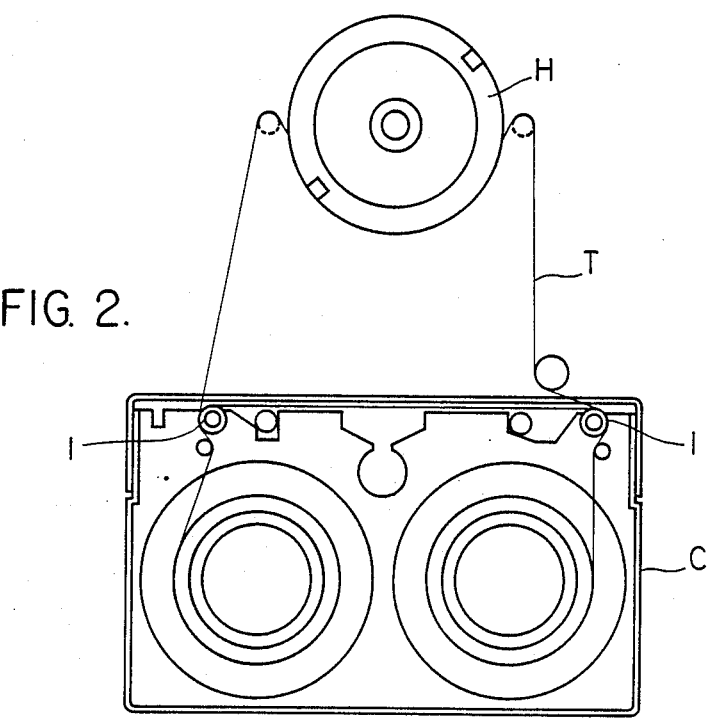
FIG. 2 is a schematic plan view for showing a general use state of the tape guide.

The composite tape guide 1 thus constructed according to the embodiments hereinbefore described is mounted and fastened for use on the cassette case C as shown in FIG. 2. The composite tape guide 1 is adapted not to rotate within the cassette case C, but is guided only through the frictional contact with the tape T. Even when the tape T is pulled out to the position of the play-back head H, as illustrated, or even when it is stored within the cassette case C, the angle at which the contact portion of the tape T hold in relation to the composite tape guide 1 never exceeded 180° and the angular proportion of the portion where the tape guide body 2 is covered by the tape contact member 3 is sufficient for more than a semi-circular surface.

The covering process is not limited to each process as hereinbefore described, and, further the combination of materials or surface treatment is not restricted thereto; and various modifications would be possible.

In a tape guide of cassette tapes for VTR according to the invention thus constructed, the cylindrical tape guide body 2 is formed of inexpensive materials such as plastics, and the circumferential surface of the tape guide body 2, at least in a range larger than the surface contacting with the tape T for a VTR is covered with a sheet member of nonmagnetic material of improved wear-resistant and anticorrosive properties but of less frictional resistance against the tape, such as stainless steel, to form a composite layer of two different materials, thereby resulting in production at a considerably reduced cost due to use of inexpensive materials for the greater part of the cylindrical tape guide body 2 as compared with conventional tape guides 81 and 82, which are formed completely of stainless steel.

The tape guide of cassette tape for VTR, on the other hand, does not rotate but remains in frictional contact with the tape T during operation.

Therefore, on the basis of such a conception, that only a portion remaining in frictional contact with the tape may be prepared with nonmagnetic materials of improved wear-resistant and anticorrosive properties, the circumferential surface of the tape guide body 2, at least in a range larger than the surface contacting with a tape for VTR is covered with a sheet of nonmagnetic material of improved wear-resistant and anticorrosive properties, such as stainless steel, to form a composite layer of two different materials, so that an arrangement of the composite tape guide 1 adapted to connect the tape T with the sheet may ensure a high precision like the conventional tape guides and a sufficient strength, by covering the tape guide body 2 with the sheet. Further, expensive materials such as stainless steel are slightly used as a sheet to extremely reduce the material cost compared with conventional tape guides 81 and 82, and also with a simple manufacturing process of merely covering the tape guide body 2 with a sheet, may achieve a considerable reduction in manufacturing cost.

What is claimed is:

1. A composite tape guide for a video cassette tape, said tape guide comprising a generally cylindrical tape guide body, said tape guide body having a circumferential exterior surface with a first portion of a predetermined diameter and a second portion of a diameter smaller than said predetermined diameter, said second portion extending over more than half of the circumference of said tape guide body, said second portion being covered with a non-magnetic sheet which is substantially wear-resistant and anti-corrosive, said non-magnetic sheet exhibiting a frictional resistance against said video cassette tape which is less than the frictional resistance exerted by said first portion of said tape guide body against said tape, said tape guide body being stepped at a junction between said first and second circumferential portions, said tape guide body having four slits of a predetermined length at different locations of said body, said sheet member being substantially arcuate and including a plurality of bent rims of which are adapted to engage said slits, said sheet having a curvature which is smaller than the curvature of said tape guide body, said sheet comprising elastic material.

2. A composite tape guide in accordance with claim 1, wherein said sheet member comprises stainless steel.

3. A composite tape guide in accordance with claim 1, wherein said sheet member comprises ceramic material.

4. A composite tape guide in accordance with claim 1, wherein said sheet member comprises manganese steel.

5. A composite tape guide in accordance with claim 1, wherein said body is plastic.

6. A composite tape guide for a video cassette tape, said tape guide comprising a generally cylindrical tape guide body, said tape guide body having a circumferential exterior surface with a first portion of a predetermined diameter and a second portion of a diameter smaller than said predetermined diameter, said second portion extending over more than half of the circumference of said tape guide body, said second portion being covered with a non-magnetic sheet which is substantially wear-resistant and non-corrosive, said non-magnetic sheet exhibiting a frictional resistance against said video cassette tape which is less than the frictional resistance exerted by said first portion of said tape guide body against said tape, said tape guide body being stepped at a junction between said first and second circumferential portions, said tape guide body having four slits of a predetermined length at different locations of said body, said sheet member being substantially arcuate and including a plurality of bent rims of which are adapted to engage said slits, said sheet having a curvature which is smaller than the curvature of said tape guide body, said sheet comprising elastic material, said sheet member comprising brass material which is plated with a non-magnetic hard metal.

* * * * *